United States Patent
Fowe

(10) Patent No.: US 10,908,614 B2
(45) Date of Patent: Feb. 2, 2021

(54) METHOD AND APPARATUS FOR PROVIDING UNKNOWN MOVING OBJECT DETECTION

(71) Applicant: HERE GLOBAL B.V., Eindhoven (NL)

(72) Inventor: James Fowe, Chicago, IL (US)

(73) Assignee: HERE GLOBAL B.V., Eindhoven (NL)

(*) Notice: Subject to any disclaimer, the term of this patent is extended or adjusted under 35 U.S.C. 154(b) by 0 days.

(21) Appl. No.: 15/847,469

(22) Filed: Dec. 19, 2017

(65) Prior Publication Data

US 2019/0187720 A1 Jun. 20, 2019

(51) Int. Cl.
| | |
|---|---|
| G05D 1/02 | (2020.01) |
| G06K 9/00 | (2006.01) |
| G06K 9/32 | (2006.01) |
| G06K 9/46 | (2006.01) |
| G06N 3/02 | (2006.01) |
| G01C 21/36 | (2006.01) |
| G06N 20/00 | (2019.01) |
| G06F 16/583 | (2019.01) |
| H04L 29/08 | (2006.01) |

(52) U.S. Cl.
CPC ....... *G05D 1/0246* (2013.01); *G01C 21/3676* (2013.01); *G06F 16/583* (2019.01); *G06K 9/00805* (2013.01); *G06K 9/3241* (2013.01); *G06K 9/4619* (2013.01); *G06N 3/02* (2013.01); *G06N 20/00* (2019.01); *H04L 67/12* (2013.01)

(58) Field of Classification Search
CPC .................................................. G05D 1/0246
USPC ........................................................ 701/28
See application file for complete search history.

(56) References Cited

U.S. PATENT DOCUMENTS

| | | | | |
|---|---|---|---|---|
| 4,906,940 A | * | 3/1990 | Greene .............. | G06K 9/00798 382/100 |
| 5,341,437 A | * | 8/1994 | Nakayama ......... | G06K 9/00798 348/118 |

(Continued)

OTHER PUBLICATIONS

Opelt, Andrea et al., A Boundary-Fragment-Model for Object Detection, European Conference on Computer Vision, ECCV 2006: Computer Vision—ECCV 2006 pp. 575-588 (https://link.springer.com/chapter/10.1007%2F11744047_44#enumeration) (hereinafter "Opelt").*

(Continued)

*Primary Examiner* — Jean Paul Cass
(74) *Attorney, Agent, or Firm* — Ditthavong & Steiner, P.C.

(57) ABSTRACT

An approach is provided for an unknown moving object detection system. The approach, for instance, involves capturing a plurality of unknown object events indicating an unknown object detected by one or more computer vision systems. The approach also involves clustering the plurality of unknown object events into a plurality of clusters based on one or more clustering parameters. The approach further involves selecting at least one cluster of the plurality of clusters based on a selection criterion. The approach further involves determining at least one operating scenario for the one or more computer vision systems based on a combination of the one or more clustering parameters associated with the selected at least one cluster.

19 Claims, 15 Drawing Sheets

(56) References Cited

U.S. PATENT DOCUMENTS

| | | | | |
|---|---|---|---|---|
| 6,345,265 B1* | 2/2002 | Thiesson | G06K 9/6296 | 706/52 |
| 6,721,453 B1* | 4/2004 | Benson | G05D 1/0221 | 382/199 |
| 8,126,642 B2* | 2/2012 | Trepagnier | G01S 17/86 | 701/423 |
| 8,165,407 B1 | 4/2012 | Khosla et al. | | |
| 8,326,048 B2* | 12/2012 | Ofek | G06K 9/00664 | 382/224 |
| 8,391,555 B2* | 3/2013 | Sakamoto | G06K 9/00798 | 382/104 |
| 8,417,446 B2* | 4/2013 | Mays | G09B 29/10 | 701/409 |
| 8,893,034 B2* | 11/2014 | King | G06F 21/36 | 715/780 |
| 8,984,237 B2* | 3/2015 | Byun | G06F 12/0607 | 711/150 |
| 9,014,905 B1* | 4/2015 | Kretzschmar | G05D 1/021 | 701/28 |
| 9,489,401 B1 | 11/2016 | Garcia et al. | | |
| 9,489,636 B2* | 11/2016 | Attenburg | G06N 20/00 | |
| 9,494,439 B1 | 11/2016 | Ross et al. | | |
| 9,507,768 B2* | 11/2016 | Cobb | G06F 40/242 | |
| 9,626,874 B1* | 4/2017 | Gupta | G08G 5/0069 | |
| 9,632,502 B1 | 4/2017 | Levinson et al. | | |
| 9,983,590 B2* | 5/2018 | Templeton | G01S 17/89 | |
| 10,474,162 B2* | 11/2019 | Browning | G05D 1/0088 | |
| 2003/0037073 A1* | 2/2003 | Tokuda | G06F 16/355 | 715/234 |
| 2003/0195955 A1* | 10/2003 | Cochran | H04L 67/10 | 709/223 |
| 2004/0249776 A1* | 12/2004 | Horvitz | G06Q 10/109 | 706/21 |
| 2007/0030391 A1* | 2/2007 | Kim | G06K 9/00751 | 348/564 |
| 2008/0069400 A1 | 3/2008 | Zhu et al. | | |
| 2008/0270338 A1* | 10/2008 | Adams | G06K 9/00986 | 706/48 |
| 2010/0104199 A1* | 4/2010 | Zhang | G08G 1/165 | 382/199 |
| 2010/0164701 A1* | 7/2010 | Bargman | G01S 5/0252 | 340/436 |
| 2010/0250145 A1* | 9/2010 | Houser | G16B 20/00 | 702/19 |
| 2011/0040756 A1* | 2/2011 | Jones | G06F 16/951 | 707/737 |
| 2011/0052067 A1* | 3/2011 | Cobb | G06K 9/6222 | 382/190 |
| 2014/0074767 A1* | 3/2014 | Horwood | B64G 3/00 | 706/52 |
| 2014/0204361 A1* | 7/2014 | Sisney | G01S 17/89 | 356/5.01 |
| 2015/0178597 A1* | 6/2015 | Kim | G06K 9/00624 | 382/103 |
| 2016/0092801 A1* | 3/2016 | Carden | G06Q 10/0631 | 705/7.12 |
| 2017/0192423 A1 | 7/2017 | Rust et al. | | |
| 2018/0024568 A1* | 1/2018 | Fridman | G05D 1/0246 | 701/28 |
| 2018/0136000 A1* | 5/2018 | Rasmusson, Jr. | G05D 1/0246 | |
| 2018/0173971 A1* | 6/2018 | Jia | G06K 9/6288 | |
| 2018/0204076 A1* | 7/2018 | Tripathi | G06K 9/6269 | |
| 2018/0211117 A1* | 7/2018 | Ratti | G06K 9/00785 | |
| 2018/0345958 A1* | 12/2018 | Lo | G08G 1/096725 | |

OTHER PUBLICATIONS

Office Action for related European Patent Application No. 18213051.8-1207, dated Apr. 17, 2019, 10 pages.

Fei-Yue et al., "Parallel driving in CPSS: a unified approach for transport automation and vehicle intelligence", vol. 4, No. 4, Oct. 2017, 577-587.

Geng et al., "A Scenario-Adaptive Driving Behavior Prediction Approach to Urban Autonomous Driving", Article, vol. 7, No. 4, Apr. 22, 2017, pp. 1-21.

* cited by examiner

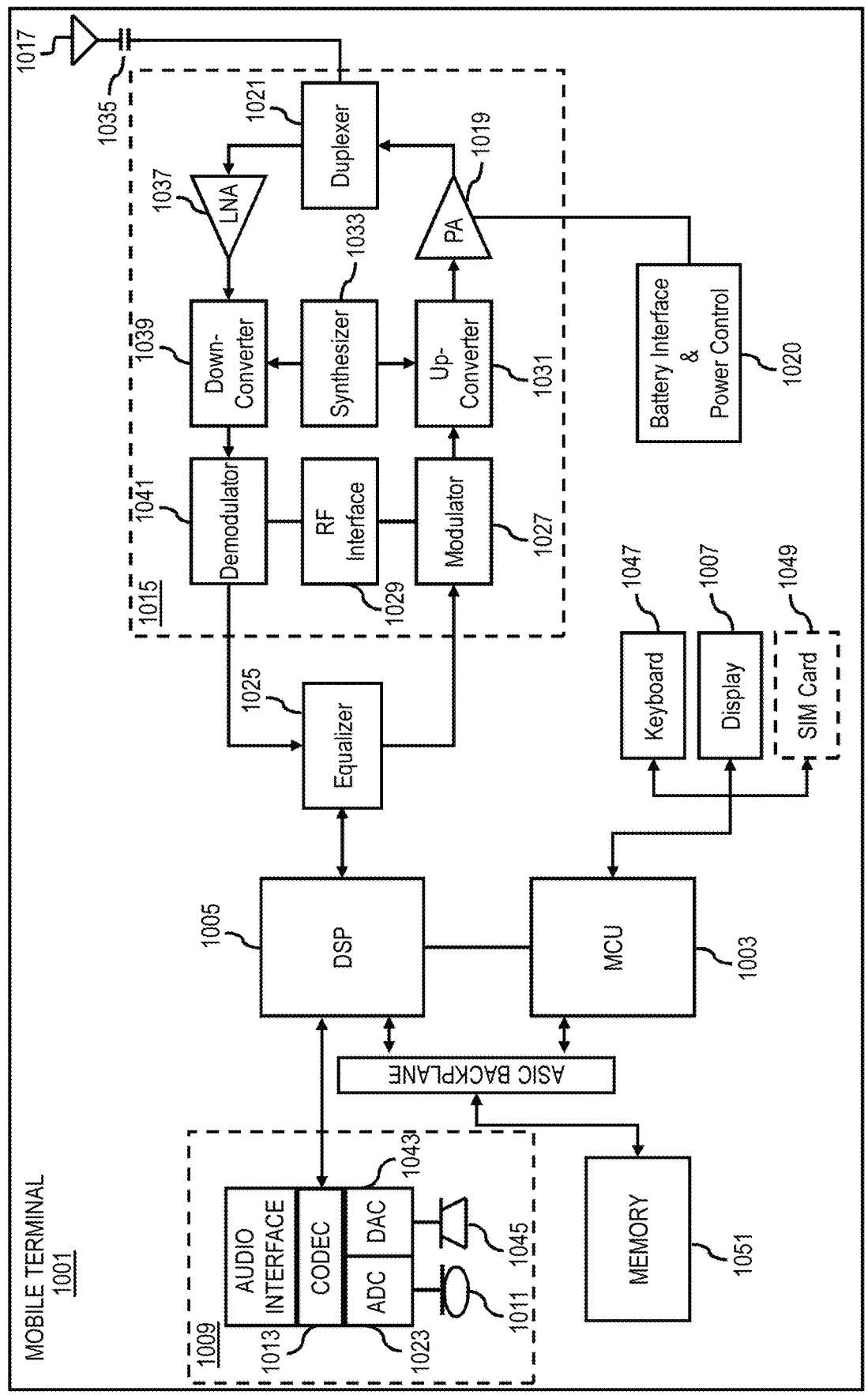

METHOD AND APPARATUS FOR PROVIDING UNKNOWN MOVING OBJECT DETECTION

BACKGROUND

Modern vehicles (e.g., autonomous and non-autonomous vehicles) can be equipped with an array of sensors to provide environmental awareness and improve safety. For example, computer vision systems can be embedded in autonomous or self-driving vehicles to recognize and track objects (e.g., moving objects) in the roadway to safely navigate over a road network. However, while modern embedded computer vision technologies on self-driving cars can be very advanced, they still have limitations in certain conditions like time of day, different weather condition, road layout, etc. These limitations can result in a failure of the computer vision system to determine the specific identity or classification of an object even when the computer vision system detects that some object is present. This type of failure is referred to as an unknown moving object event. Accordingly, service providers face significant technical challenges to identifying the conditions when these types of failures can occur and then taking appropriate action to mitigate the effects of the failures.

SOME EXAMPLE EMBODIMENTS

Therefore, there is a need for an approach for providing unknown object detection and for determining the conditions or scenarios in which object detection failures would result in an unknown object detection event.

According to one embodiment, a method for providing an unknown object detection system comprises capturing a plurality of unknown object events indicating an unknown object detected by one or more computer vision systems. The method also comprises clustering the plurality of unknown object events into a plurality of clusters based on one or more clustering parameters. The method further comprises selecting at least one cluster of the plurality of clusters based on a selection criterion. The method further comprises determining at least one operating scenario for the one or more computer vision systems based on a combination of the one or more clustering parameters associated with the selected at least one cluster.

According to another embodiment, an apparatus for providing an unknown object detection system comprises at least one processor, and at least one memory including computer program code for one or more computer programs, the at least one memory and the computer program code configured to, with the at least one processor, cause, at least in part, the apparatus to capture a plurality of unknown object events indicating an unknown object detected by one or more computer vision systems. The apparatus is also caused to cluster the plurality of unknown object events into a plurality of clusters based on one or more clustering parameters. The apparatus is further caused to select at least one cluster of the plurality of clusters based on a selection criterion. The apparatus is further caused to determine at least one operating scenario for the one or more computer vision systems based on a combination of the one or more clustering parameters associated with the selected at least one cluster.

According to another embodiment, a non-transitory computer-readable storage medium carries one or more sequences of one or more instructions which, when executed by one or more processors, cause, at least in part, an apparatus to capture a plurality of unknown object events indicating an unknown object detected by one or more computer vision systems. The apparatus is also caused to cluster the plurality of unknown object events into a plurality of clusters based on one or more clustering parameters. The apparatus is further caused to select at least one cluster of the plurality of clusters based on a selection criterion. The apparatus is further caused to determine at least one operating scenario for the one or more computer vision systems based on a combination of the one or more clustering parameters associated with the selected at least one cluster.

According to another embodiment, an apparatus for providing an unknown object detection system comprises means for capturing a plurality of unknown object events indicating an unknown object detected by one or more computer vision systems. The apparatus also comprises means for clustering the plurality of unknown object events into a plurality of clusters based on one or more clustering parameters. The apparatus further comprises means for selecting at least one cluster of the plurality of clusters based on a selection criterion. The apparatus further comprises means for determining at least one operating scenario for the one or more computer vision systems based on a combination of the one or more clustering parameters associated with the selected at least one cluster.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 10 is a diagram of a mobile terminal (e.g., handset) that can be used to implement an embodiment of the invention.

DESCRIPTION OF SOME EMBODIMENTS

Examples of a method, apparatus, and computer program for providing unknown object detection are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
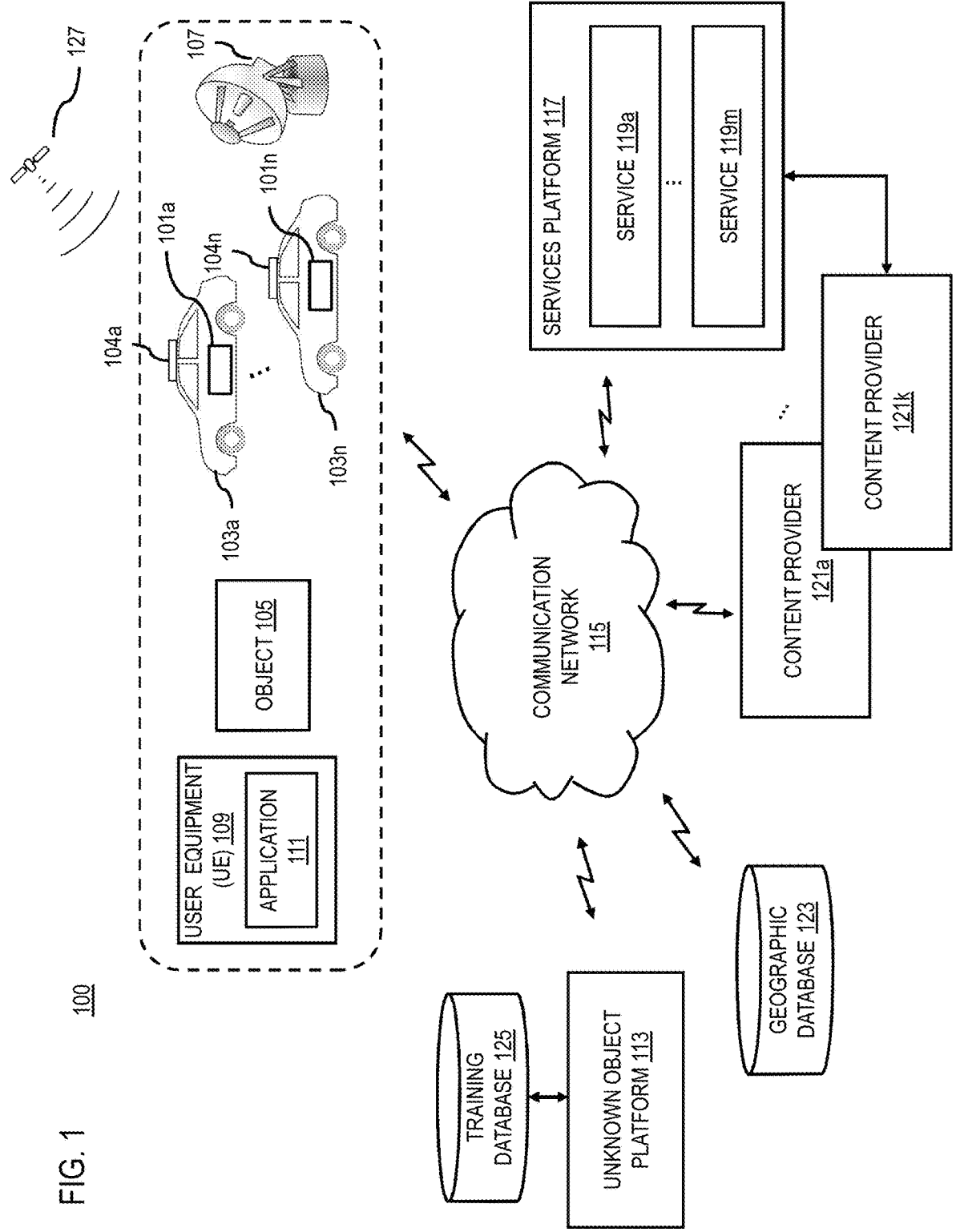
FIG. 1 is a diagram of a system capable of providing unknown object detection, according to one embodiment.

FIG. 1 is a diagram of a system capable of providing unknown object detection, according to one embodiment. Machine learning-based computer vision systems (e.g., computer vision systems 101a-101n respectively embedded in vehicles 103a-103n, also collectively referred to as vehicles 103) have enabled a variety of image recognition based services and applications. Generally, a typical computer vision systems 101a-101n (also collectively referred to as computer systems 101 includes one or more sensors 104-104n (e.g., cameras and/or other vehicle sensors) in combination with object recognition engines (e.g., machine learning based feature detectors) to recognize objects 105 from sensed data in real-time or near real-time. Although the various embodiments are discussed with respect to using computer vision systems 103 in vehicles 103 (e.g., self-driving cars), the computer vision system 101 can also be implemented in any other type of vehicle (e.g., aerial drones, planes, boats, trains, etc.). In addition or as an alternate to mounting the computing vision system 101 in vehicles 103, in some embodiments, the computer vision system 101 can be implemented as infrastructure-based systems that are mounted to fixed installation points 107, or as components of user equipment devices (UE) 109 (e.g., mobile devices) which can execute applications 111 for object detection and recognition. Accordingly, any embodiments discussed herein that are described with respect to a vehicle-based computer vision system 101 can also be applied to computer vision systems 101 used with fixed installations 107 and/or UEs 109.

For example, in the automotive field, computer vision and machine learning have enabled real-time mapping and sensing of a vehicle 103's environment, particularly with respect to autonomous or semi-autonomous vehicles (e.g., self-driving cars). Such an understanding of the environment provides increased safety and situational awareness while driving in a vehicle 103 by, for instance, providing information about potential obstacles, the behavior of others on the road, and safe, drivable areas. An understanding of where other cars/objects are and what they might do is important for a vehicle 103 to safely operate. For example, vehicles 103 generally must avoid both static obstacles (e.g., guard rails, medians, signs, lamp posts, etc.) and dynamic obstacles (e.g., other vehicles, pedestrians, animals, road debris, etc.). By recognizing what those obstacles are, the vehicles 103 can take appropriate action to safely navigate around the obstacles or objects.

One technique that has shown significant ability in image recognition is the use of convolutional neural networks (e.g., CNNs) or equivalent machine learning models/algorithms. For example, neural networks have shown unprecedented ability to recognize objects and/or their movements in image data (e.g., individual images and/or image sequences/videos), understand the semantic meaning of image data, and classify/identify the objects depicted in image data. However, while CNNs, other machine learning models, and/or equivalent object detection processes used in self-driving or autonomous vehicles are very advance, they still have limitations under which their object recognition or predictive abilities may fail to classify a detected object. For example, certain conditions like time of day, different weather conditions, road layout, etc. can make it difficult for a computer vision system 101 to classify a detected object which can potentially affect safety, particularly when the computer vision system 101 is used for self-driving vehicles.

In particular, one of the biggest value users are demanding from self-driving cars is safety. Accordingly, vehicle manufacturers and related service provide face significant technical challenges to building multiple layers of safety systems and processes into the use of self-driving cars. For example, it is a difficult technical challenge to determine if or when recognition failures can occur in computer vision systems 101 in embedded in self-driving cars or in other use cases (e.g., infrastructure or mobile device implementations). This is because no matter how well trained the object classifier is used for the computer vision system 101, there can also be new or unexpected circumstances that are encountered in the field that can cause classification failures or errors. In one embodiment, a "failure" refers to an event in which the computer vision system 101 is operating properly to detect the presence of some object, but cannot identify or classify the object to a target degree of certainty/probability. For example, scenarios such as different lighting conditions, unexpected movements, different camera angles, partially obscured objects, and/or the like can result in a potential recognition failure.

To address these technical challenges, the system 100 of FIG. 1 introduces a capability to obtain data of "unknown object" (UO) or "unknown moving object" (UMO) events from computer vision systems 101 (e.g., mounted in self-driving cars) via, for instance, an unknown object platform 113. In one embodiment, the system 100 can process this UO or UMO data using, for instance, one or more clustering algorithms or equivalent to determine under what operating scenarios the UO or UMO events are most likely or most frequently occurs. The clustering can be based spatial-temporal parameters and/or other extended features (e.g., weather conditions, vehicle type, etc.). In this way, the resulting processed dataset will be a high dimensional spatial-temporal dataset with optional extended features from which operating scenarios (e.g., combinations of features) can be determined to identify condition where the computer vision systems 101 are likely to fail or have been most frequently observed to fail.

In one embodiment, the system 100 may be applied for detecting unknown objects (UOs) in general or to unknown moving objects (UMOs) in particular. For example, in use cases wherein the system 100 is configured to minimize resource usage, the system 100 can be limited to processing UMO events. This is because while there are many static objects on the road that are unknown (unrecognized) by self-driving cars, the most dangerous ones are generally the moving objects. A moving and dynamic object has the potential of hitting a car and it is important for the car's computer vision system 101 to know if the UMO is a pedestrian or bike, or another car or an animal or a specific type of animal. This knowledge would help the self-driving car know how to react to the object and how to maneuver the car to ensure there is no accident. In either case, the terms UO and UMO can be used interchangeably in the embodiments described herein so that the embodiments can apply to either unknown objects (e.g., static and/or dynamic objects), unknown moving objects (e.g., dynamic objects only), or both.

In one embodiment, the unknown object platform 113 is a cloud or network-side component that works in combination with the computer vision system 101 of the vehicle 103, fixed installation 107, and/or UE 109. Hence, the unknown object detection intelligence is not embedded only in the artificial intelligence or machine learning engines of the computer vision system 101 of the vehicle 103, fixed installation 107, and/or UE 109. In other words, the unknown object platform 113 augments the local intelligence of the computer vision systems 101 over a communication network 115 by embedding different historical knowledge and artifacts of UO/UMO events in the cloud. In one embodiment, the cloud (e.g., the unknown object platform 113) would be the expanded brain of the self-driving vehicles 103 that is managed by a service or content provider (e.g., a services platform 117 providing services 119a-119m—collectively services 119, and/or content providers 121a-121k—collectively content providers 121).

In one embodiment, the services platform 117, services 119, and/or content providers 121 can also provide map data (e.g., high definition (HD) map data) via a geographic database 123 to the self-driving vehicles 103, and dynamic (fresh) map updates can be fetched from the cloud (e.g., the geographic database 103) by the vehicles 103 in real-time. This can help the self-driving vehicles 103 have the knowledge of the traditional "static" road network, but it historically does not help with objects (e.g., UOs or UMOs) that are not related to the map. In one embodiment, the system 100 provides another way to augment the intelligence of self-driving vehicles 103 by storing location-based insight regarding UOs/UMOs. For example, the system 100 exploits the fact that a difficult to understand or recognize object for a computer vision system 101 of self-driving vehicle 103 will most likely not be recognizable by other self-driving vehicles 103. Hence, the system 100 identifies scenarios when such UOs/UMOs occurred or are likely to occur so that self-driving vehicles 103 and/or other potential user devices are better prepared to avoid such surprises.

Figure 2:
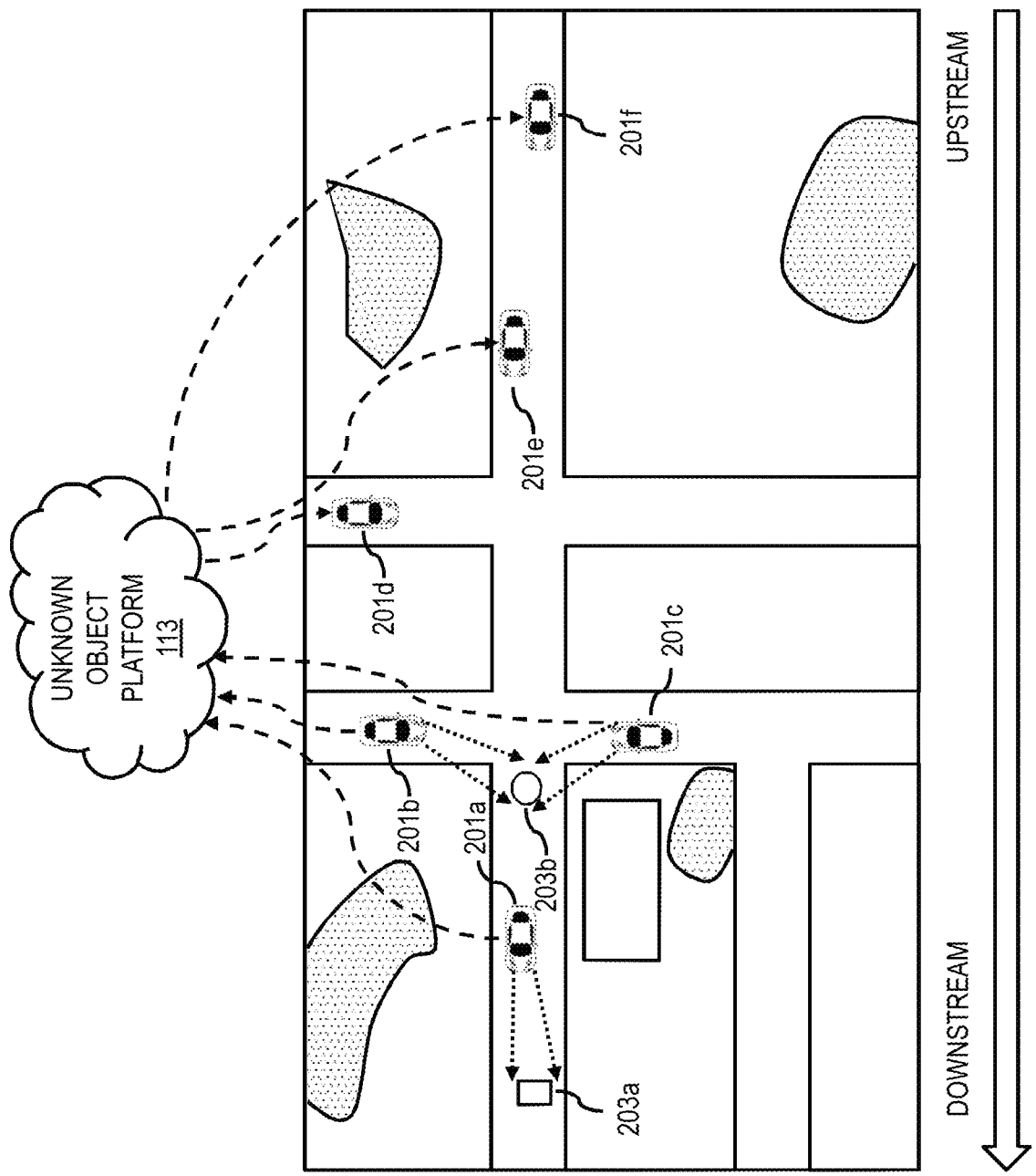
FIG. 2 is a diagram illustrating an example architecture for processing unknown object events, according to one embodiment.

As shown in the example of FIG. 2, self-driving car 201a-201c respectively see object 203a or 203b (e.g., moving objects in the roadway) that is unrecognized, the self-driving cars transmit UO event messages to the unknown object platform 113. As previously discussed, an object is unrecognized or unknown in that the object detection and object tracking processes of the computer vision systems 101 of the self-driving cars 201a-201c are working properly but object recognition failed to work in that the object is seen but not recognized to determine what exactly the detected object is. This failed object recognition poses a big risk, and it is important for other self-driving cars 201d-201f upstream of the UO events to know about the UO events. In this case, upstream refers to a relative position of the self-driving cars 201d-201f with respect to the UO events that would bring the UO events into their travel path at a future time. Accordingly, in one embodiment, the unknown object platform 113 can relay the reported UO events to the upstream self-driving cars 201d-201f.

In one embodiment, the system 100 can also learn from the experience of detected UO events, and provide better ways for the self-driving cars 201a-201f to maneuver when similar UO events occur again. In yet another embodiment, the captured UO event data can become a training dataset for improving the object feature classifier. In this way, the captured UO event data and the images contained therein can be crowdsourced, and then provided to real-humans to interpret what is in the image and produce a labeled training dataset that can be used to re-train the object feature classifier of the computer vision system 101 or to re-train self-driving artificial intelligence algorithms to be smarter in the future. This re-training can benefit not just the cars 201a-201c that detected the UO, but every other self-driving car can get smarter by having the system 100 transmit the re-trained machine learning models to other self-driving cars.

In one embodiment, as the data of UMO events builds up in the cloud (e.g., in the unknown object platform 113), the system 100 can run cluster discovery algorithms or equivalent on the UO event data to determine the operating scenarios or patterns (e.g., combinations of spatio-temporal parameters and extended features such as location, time, weather, type of car, size, speed and direction of UO, maneuvers taken to avoid accident, etc.) that leads to the highest number or high probability of UO events. In one embodiment, this clustering analysis of UO events can provide insight to automotive OEMs, state DOTs, services providers, etc. regarding where computer vision systems 101 may fail to recognize objects. This information can be used for any number of uses cases including, but not limited to the use cases listed below.

Self-driving vehicles 103 with access to operating scenarios or patterns most closely associated UO events will give the vehicles 103 intelligence for improved route choice in which safety is part of the criteria. When a high probability UO shows up en-route either due to bad weather or time of day, the self-driving vehicle 103 can take action to mitigate any safety concerns such as re-routing to take safer road segments with lower UO probability.

The computer vision systems 101 and artificial intelligence (AI) algorithms in self-driving vehicles 103 can automatically get more intelligent and smarter over time as the computer vision system 101 continue to get updated machine learning models or algorithms that have been trained by labeled UO data.

City planners and state DOTs will have analytics insight on critical locations such critical UMO events are occurring frequently on the road network and they can take policy decisions that mitigates incidents Self-driving vehicles 103 driving towards a UO event (e.g., a UO event detected by another vehicle 103 downstream) can be alerted in real-time via the unknown object platform 113 (e.g., a cloud service) to avoid the route or be more cautious.

The system 100 can crowdsource captured UO data to human users over the Internet for object identification and training might to advantageously increase available of labeled training data set, which traditionally has been limited or labor intensive to generate.

The system 100 can track the evolution of UO events and their effects on improving machine learning feature detectors and AI algorithms for object detection can be an asset to the scientific community focused on improving AI. More specifically, the rate of UO detection can be used to track the improvement in the performance of computer vision systems 101 with respect to object detection over time.

In summary, the embodiments of the system 100 provide a cloud-based data processing system that improves computer vision systems 101 and increase the safety of self-driving vehicles 103. The embodiments also improve how the vehicles 103 can mitigate driving errors when faced with a UO event. In yet another embodiment, the UO data is stored in the cloud and can be used to determine UO scenarios or patterns which are likely to result in UO events. These scenarios or patterns can then be provided as feedback assets to self-driving vehicles 103 driving on the road and also a potential data for machine learning training data. In one embodiment, the system 100 enables updates to the object classifiers used in the computer vision systems 101 of self-driving vehicles 103 or other devices to reduce the occurrence of UO detections. The system 100 can also provide online real-time alerts/updates to self-driving vehicles 103 when navigating a road segment with high UO probability.

Figure 3:
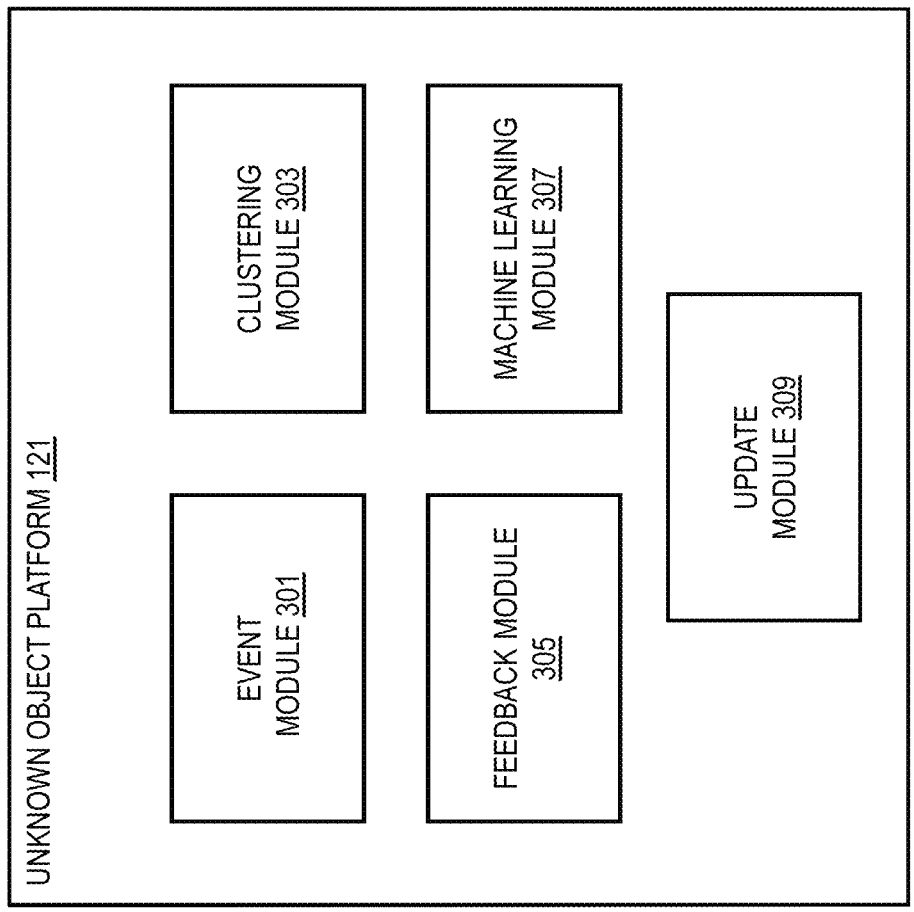
FIG. 3 is a diagram of the components of an unknown object platform, according to one embodiment.

FIG. 3 is a diagram of the components of an unknown object platform 113, according to one embodiment. By way of example, the unknown object platform 113 includes one or more components for providing unknown object detection according to the various embodiments described herein. It is contemplated that the functions of these components may be combined or performed by other components of equivalent functionality. In this embodiment, the unknown object platform 113 includes an event module 301, a clustering module 303, a feedback module 305, a machine learning module 307, and an update module 309. The above presented modules 301-309 and components of the unknown object platform 113 can be implemented in hardware, firmware, software, or a combination thereof. Though depicted as a separate entity in FIG. 1, it is contemplated that the unknown object system 113 may be implemented as a module of any of the components of the system 100 (e.g., a component of the computer vision system 105, the vehicle 103, etc.). In another embodiment, one or more of the modules 301-309 may be implemented as a cloud based service, local service, native application, or combination thereof. The functions of the unknown object platform 113 and the modules 301-309 are discussed with respect to FIGS. 4-8 below.

Figure 4:
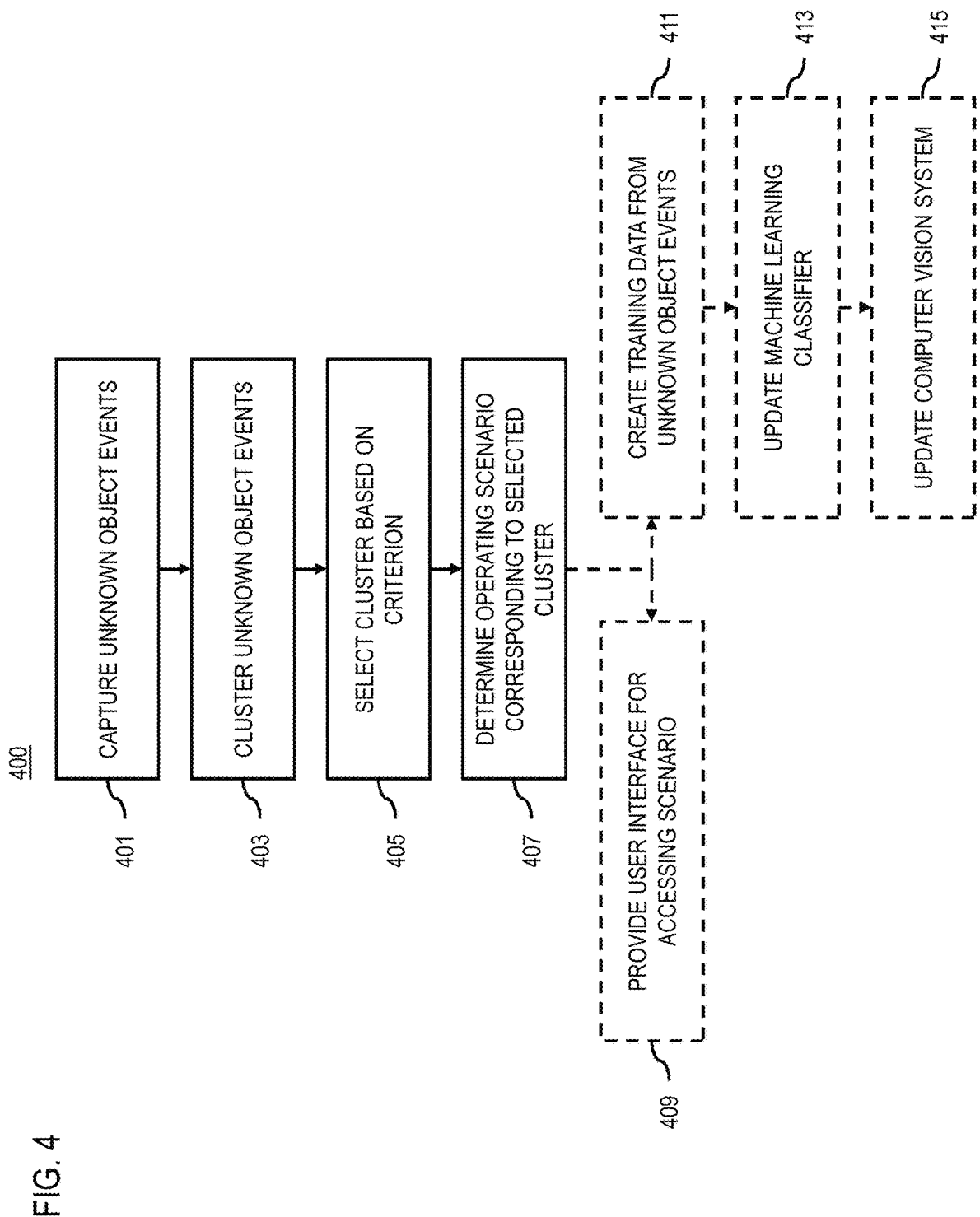
FIG. 4 is a flowchart of a process for providing unknown object detection, according to one embodiment.
Figure 5:
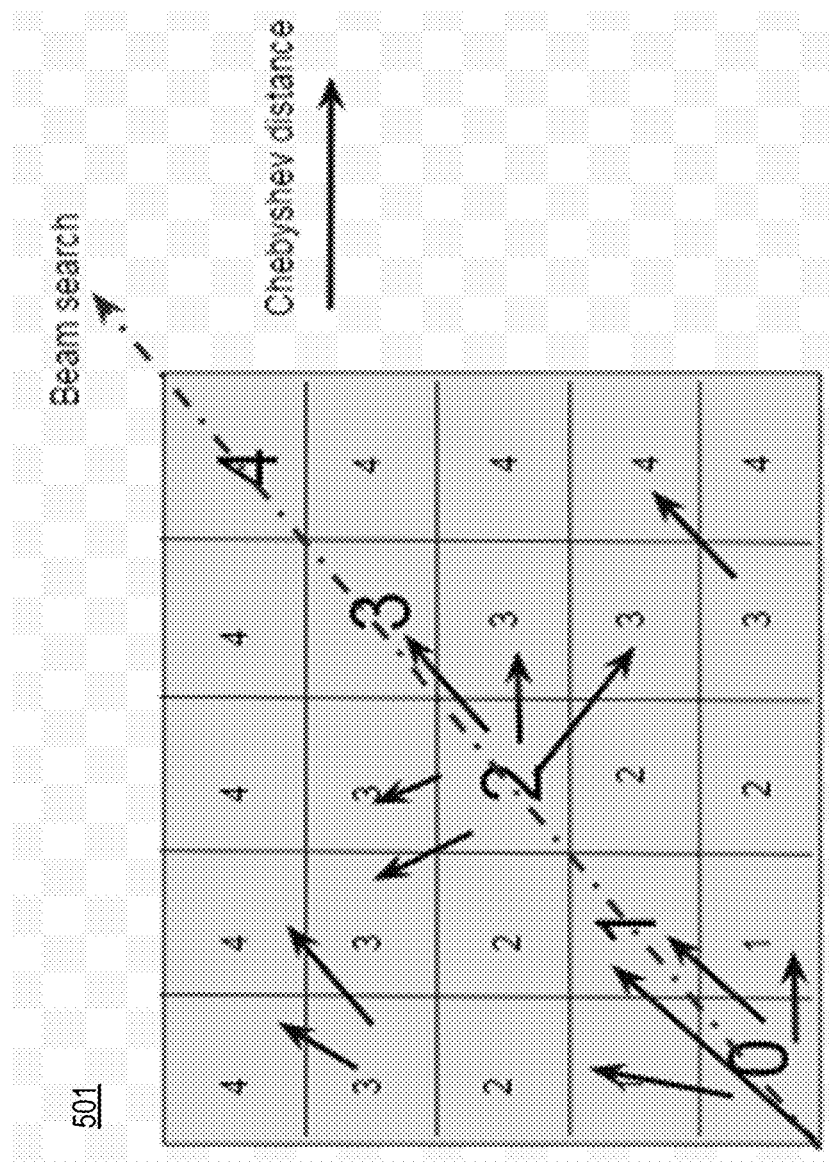
FIG. 5 is a diagram illustrating an example of a custom beam clustering search for processing unknown object event data, according to one embodiment.
Figure 9:
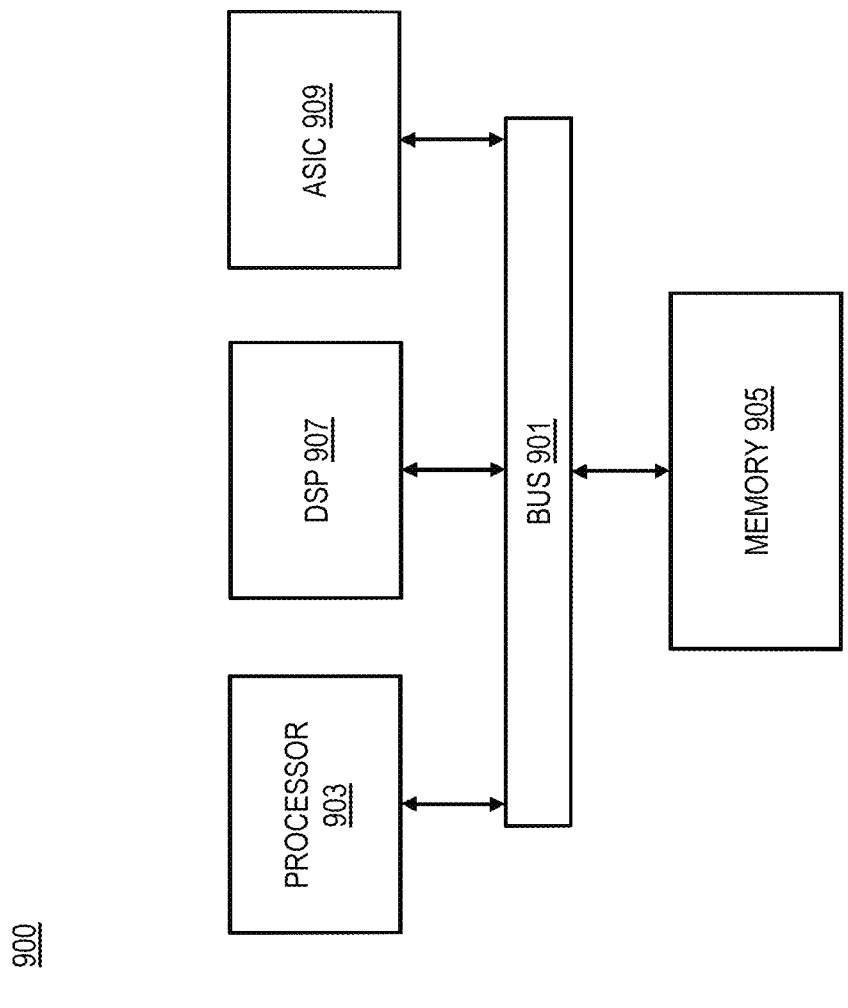
FIG. 9 is a diagram of a chip set that can be used to implement an embodiment of the invention.

FIG. 4 is a flowchart of a process for providing unknown object detection, according to one embodiment. In various embodiments, the unknown object platform 113 and/or any of the modules 301-309 of the unknown object platform 113 may perform one or more portions of the process 300 and may be implemented in, for instance, a chip set including a processor and a memory as shown in FIG. 9. As such, the unknown object platform 113 and/or the modules 301-309 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

In step 401, the event module 301 captures a plurality of unknown object events indicating an unknown object detected by one or more computer vision systems 101. In one embodiment, the AI algorithms or machine learning feature detectors of computer vision systems 101 embedded in vehicles 103 or other device are instructed to report every UO event that they detect on the road. As discussed above, a UO event occurs when the computer vision system 101 is operating properly and detects an object, but is unable to classify or identify the exact or particular object. For example, an object is detected but the computer vision system 101 cannot classify the object as a pedestrian, another car, an animal, a road sign, etc. to a target probability or degree of certainty. In an embodiment where the event module 301 is detecting only UMO events, the computer vision system 101 can further determine that the detected object is moving versus being stationary or static to initiate a UMO detection. The UO/UMO event is then automatically sent to and captured by the event module 301 and stored accordingly (e.g., in the cloud) to build the UO/UMO artifact. By way of example, the UO data sent can include, but is not limited to: shape of object, speed of object, direction of object, road segment object was found, time of day, weather (temperature, rain, and snow), vehicle type, speed of car, heading, etc., and/or any combination thereof.

In one embodiment, the one or more computer vision systems 101 are mounted on a vehicle traveling in a road network (e.g., vehicles 103), mounted on a structure that is on or proximate to the road network (e.g., fixed installations 107), mobile devices (e.g., UEs 109), or a combination thereof. Moreover, in an automotive scenario, the vehicle 103 including the computer vision system 101 as a component can be configured to operate autonomously or semi-autonomously (e.g., self-driving cars).

In one embodiment, the captured UO data can then be analyzed, for instance, with clustering algorithms that can handle high dimensional datasets (e.g., k-means algorithm, DBSCAN, hierarchical clustering algorithms, KNN, custom beam cluster search (BCS) algorithms, and/or equivalent. For example, in step 403, the clustering module 303 clusters the plurality of unknown object events into a plurality of clusters based on one or more clustering parameters. By way of example, the one or more clustering parameters include one or more spatial-temporal parameters, a detected shape of an unknown object, a speed of the unknown object, a direction of the unknown object, a road segment or a location at which the unknown object was detected, a time of day at which the unknown object was detected, a weather condition occurring when the unknown object was detected, a vehicle type associated with the one or more computer vision systems, a speed of the one or more computer vision systems, a heading of the one or more computer vision systems, or a combination thereof. In one embodiment, the clustering parameters can mirror the features reported in the UO event data.

In one embodiment, the clustering algorithms are used to discover clusters in the high dimensional UO data. High dimension refers, for instance, to assigning each clustering parameter as a different dimension of the UO data space. In one embodiment, the parameters of the largest clusters are an indication of the feature or combination of features that most likely has the highest probability or highest observed frequency of re-producing a UO/UMO event. This feature or combination of features can be referred to as the operating scenario or patterns that are most associated with detecting UOs. For example, the operating scenario or pattern would specify the combination of spatial-temporal parameters (e.g., time and/or location), and extended features (e.g., weather conditions, lighting conditions, vehicle types, object shape, etc.) that would result in a high probability of detecting UOs.

In other words, the clustering module 303 selects at least one cluster of the plurality of clusters based on a selection criterion (step 405). In one embodiment, the selection criterion includes, but is not limited to: (1) a highest number of unknown object events so that the cluster with the highest number of UO events would be selected; (2) a probability of having the highest number of the plurality of unknown object events, so that the cluster with the high observed or predicted probability of exhibiting UO events would be selected; and/or the like. In step 407, the clustering module 303 then determines at least one operating scenario for the computer vision systems 101 based on a combination of the clustering parameters associated with the selected cluster. In one embodiment, the operating scenario, the combination of clustering parameters associated with the selected cluster, or a combination thereof can be stored in a database for access by authorized computer vision systems 101, the vehicles 103 in which the computer vision systems 101 are equipped, or a combination thereof.

In one embodiment, once the operating scenario or pattern is determined, the scenario can be used to determine when the computer vision systems 101 and/or the corresponding vehicle 103 or device is operating under the determined scenario. In other words, the unknown object platform 113 can determine whether the current spatial-temporal parameters and extended features matches the scenario or pattern associated with a high likelihood of UO events. If there is a match within predetermined thresholds, then the unknown object platform 113 can interact with the vehicle 103 or other device to initiate action to mitigate an expected object detection uncertainty of the corresponding computer vision system 101 (e.g., by taking a different route with a lower probability of UO events, driving more cautiously, reverting to manual control of the vehicle 103, etc.).

As noted above, the clustering module 303 can use any clustering process known in the art to analyze the capture UO event data. However, in one embodiment, the clustering module 303 can use a customized cluster analysis algorithm (e.g., a customized beam cluster search (BCS) algorithm. This is because the clustering analysis used in the embodiments can be non-trivial for popular clustering algorithms like k-means because it can be difficult to know or guess the number clusters k that will result from the UO data a priori. Hence, it would require a lot of tuning and manual user massaging to be able to use k-means for UO data process, and it may still not discover optimal clusters.

The address this technical problem, the clustering module 303 can use a custom high dimensional clustering algorithm BCS that fits into solving the UO data clustering problem as it is a cluster search algorithm for high dimensional data. More specifically, the clustering module 303 can use a novel Grid-based Heuristic Clustering Algorithm designed for processing of dynamic and noisy data in which the physical systems generating these data is fairly understood by the user. An example of this grid-based BCS algorithm is illustrated in the example 501 of FIG. 5. This then gives the user the intuitive ability to describe the expected cluster gaps (Lgap) as a function of the data's sample space. The Lgap serves as an input parameter to BCS and it is more pragmatic compared to the tedious effort to determine the value of K when using K-means clustering. For the custom BCS algorithm, K is actually one of the outputs rather than input; hence making this algorithm not only useful for clustering, but for detection of intrinsic divisions that could happen in a set of streaming data cluster.

In one embodiment, the custom BCS clustering algorithm can be used for an unknown object detection use case. For example, an alert system can be set to be triggered when K is detected to be K>x configured value or when K=x. This alert would indicate that current spatial-temporal features or extended features are associated with a high occurrence or likelihood of UO events.

In another embodiment, the custom BCS clustering algorithm can be used for an UO event data clustering use case. For example, all K clusters are generated with all intrinsic cluster's statistics (e.g., count, mean, standard deviation, etc.), and the number and sizes of clusters generated changes dynamically as the underlining dynamic data changes (e.g., as more UO events are captured).

BCS can be significantly faster than K-means because BCS does heuristic approximation using buckets in a grid-matrix that summarizes the main data points. This method exploits the fact that the data being processed is noisy, hence obtaining a perfect cluster placement of each data-points (like in K-means) is not important as some of them are erroneous in reality. Hence, BCS seeks to capture the overall cluster shape of the entire data set using the grid-based buckets approach.

The following is an example of pseudocode for implementing the custom BCS algorithm, according to one embodiment:

```
V ← {a set of points in a Cartesian 2D space (x,y)}
function BCS(V(x,y), MG):
  s ← STD(V(x*y))              // V(x*y) is beam distance = Chebyshev-Dist(V(x/Δx,y/Δy),
V(0,0));
  m ← mean(V(x*y))
  V ← V ∀ V < m + 2s & V > m − 2s    //outlier filtering
  Range_x ← Range(V(x));       //range of x-axis only
  Range_y ← Range(V(y));
  Δx ← Range_x/20              //the goal is a 20 by 20 grid of buckets ...
  Δy ← Range_y/20
  Lgap ← MG*Euclidean-Dist((max(Vx),max(Vy)),(0,0))    //0<MG<1 it's the measure of
gap
  x0,y0,k ← 0;
  Matrix[20][20] ← 0;
  for i ← 1 to 20              //bucketizing 2D space into equal 20 by 20 matrix of buckets
    for j ← 1 to 20
      Matrix[i][j] ← new bucket(x0,y0)   //the point(x0,y0) is the base of the bucket closest to
the origin
      y0 ← y0+Δy
    end for
    x0 ← x0+Δx
  end for
  for each V
    for each bucket ∈ Matrix[ ][ ]
      If V within bucket
        Then bucket.add(V)             //load data into the buckets
end for
for each bucket ∈ Matrix[ ][ ]         //find the center of each bucket
    bucket.compute_mean_point( )
    PriorityQueue ← bucket             //priority cost = Chebyshev-Dist(bucket_mean(x/Δx,y/Δy),
V(0,0));
end for
C ← new Cluster
Clusters ← { }
for each non-empty bucket in Priority Queue           //the main cluster
search
    IF Distance(C.mean_point − bucket.mean_point) < Lgap           //true if C is
empty
      Then C add V ∀ V ∈ bucket
    Else IF all (C ∈ Clusters).mean_point − bucket.mean_point < Lgap    //check other
clusters
      Then C add V ∀ V ∈ bucket)
    Else
      Clusters add C                   //keep discovered clusters
      C ∈ new Cluster
      C add V ∀ V ∈ bucket             //bucket must join one cluster
    End IF
end for
return Clusters{ }                     //final results is a List of clusters
END BCS
```

As discussed, BCS has the capacity to handle high dimensional data (e.g., beyond 2D). This is achieved by ensuring the all dimensions are normalized to a value between 0 and 1 so that only relative distances are used as cluster distance. Normalization can be achieved by dividing each data-point with the range value or max value of a single feature (e.g., temperature, speed, time of day, etc.).

Figure 6A:
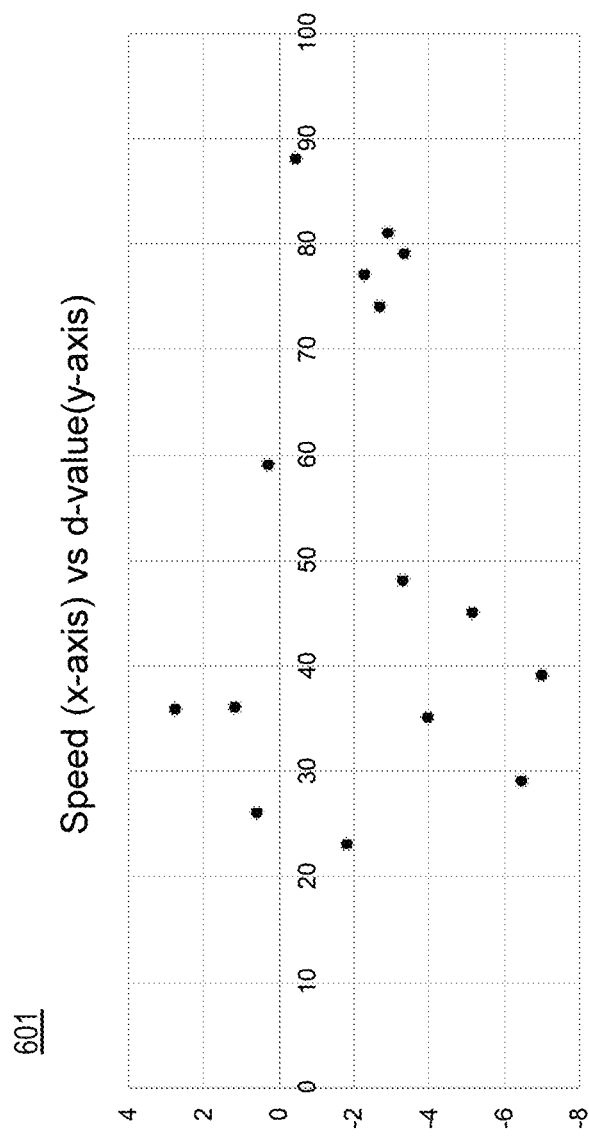
FIGS. 6A-6F illustrate example results of the BCS clustering process, according to one embodiment.
Figure 6B:
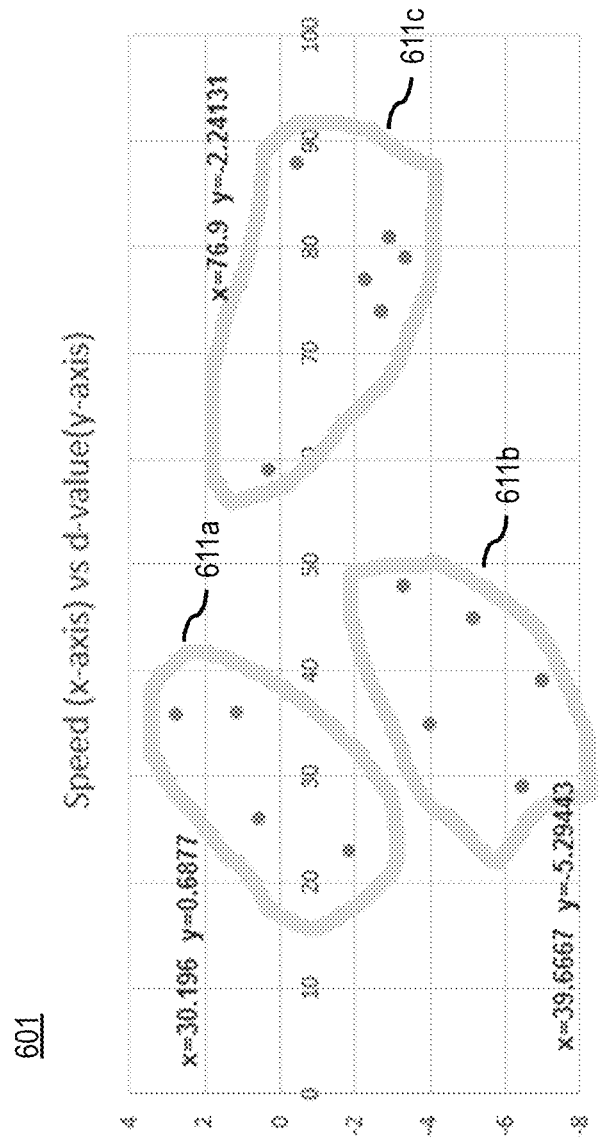
Figure 6C:
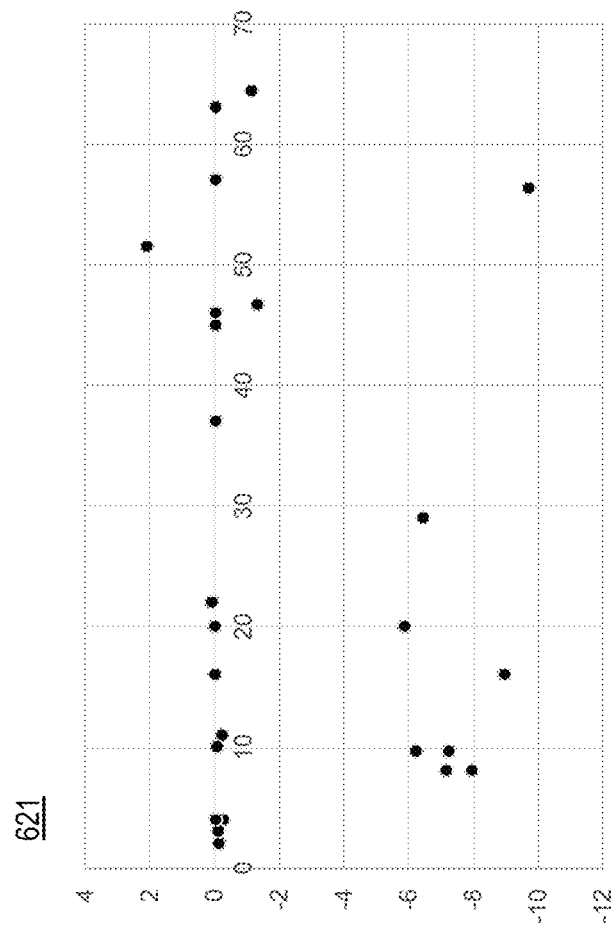
Figure 6D:
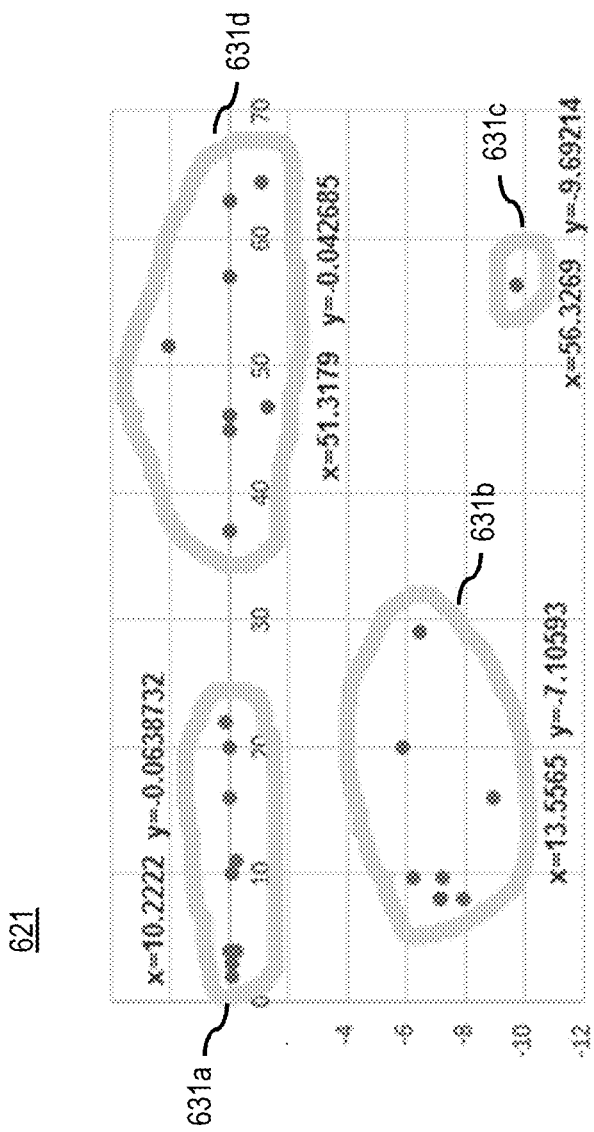
Figure 6E:
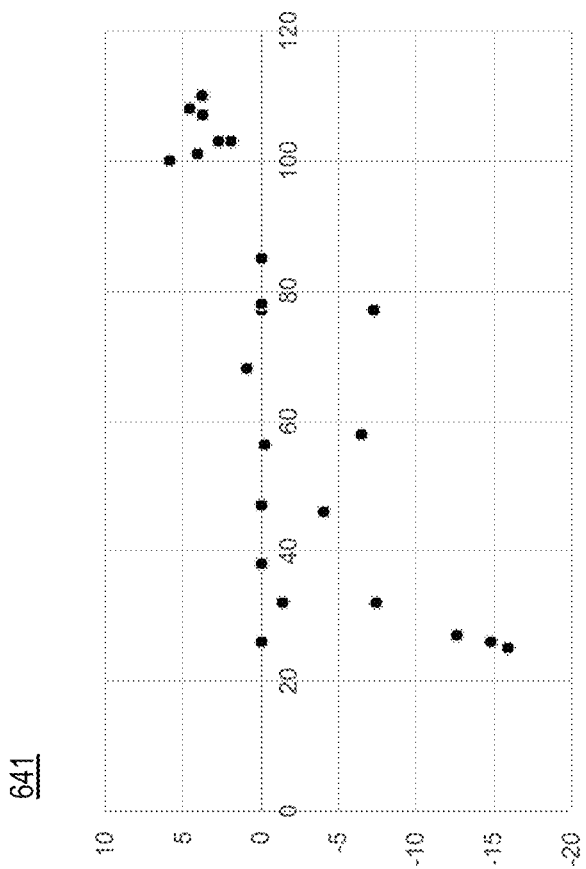
Figure 6F:
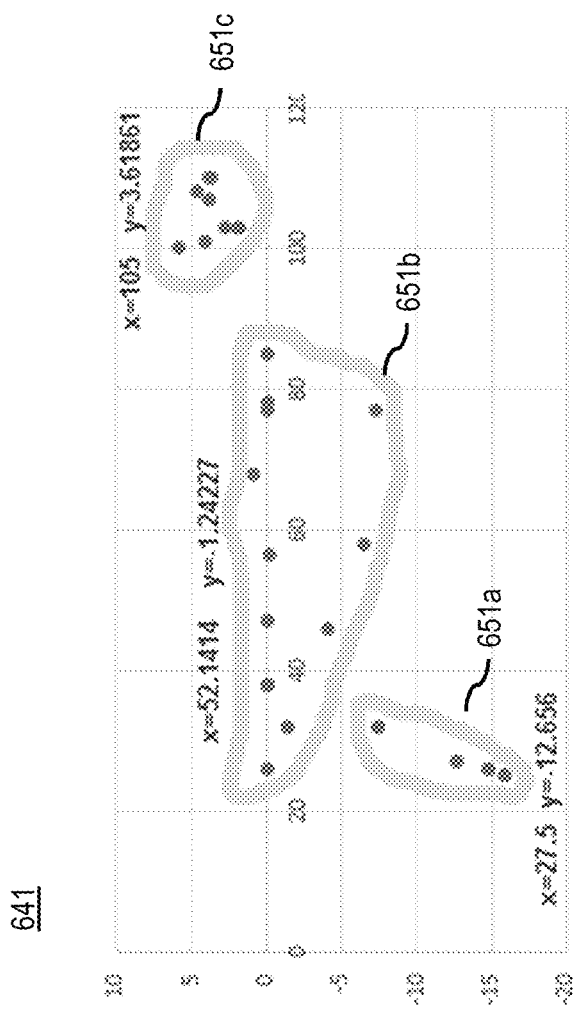

Testing the BCS algorithm on some probe-data produces the results illustrated in FIGS. 6A-6F. In the examples of FIGS. 6A-6F, the clustering is performed in a two-dimensional space (e.g., speed versus a generic feature "d"), but any higher dimensional space can be used. As shown, various number of clusters can be discovered, depending on the configured minimum cluster count, minigap between clusters and maximum standard deviation of each cluster. For example, the grid 601 of UO events of FIG. 6A results in discovering three clusters 611a-611c with the means of the respective clusters displayed by each cluster 611a-611c as shown in FIG. 6B. Similarly, the grid 621 of UO events of FIG. 6C results in discovering four clusters 631a-631d with means as shown in FIG. 6D; and the grid 641 of UO events of FIG. 6E results in discovering three clusters 651a-651c with means as shown in FIG. 6F. In one embodiment, if BCS is applied to UO data for analysis, the mean of the discovered clusters is a measure of the degree to which a particular feature contributed to the cluster.

After the UO event data has been processed, the unknown object platform 113 can use the UO data under any number of use cases. For example, in one optional use case, in optional step 409, the feedback module 305 can expose or provide an interface (e.g., an application programming interface (API)) via the cloud where automotive OEMs (e.g., self-driving cars) or other devices using computer vision systems 101 can fetch the combination of features that indicates highest probability of experiencing a UO event. The cars or other devices can then take mitigating actions in response to the UO data as previously described.

In another use case, the unknown object platform 113 can use the UO event data to improve machine learning or AI systems. For example, in optional step 411, the machine learning module 307 creates training data for a machine learning object classifier from the unknown object events. More specifically, the machine learning module 307 aggregates image data associated with the unknown object events. The machine learning module 307 then transmits the image data for labeling (e.g., crowdsource labelers or other data annotation systems) to identify the unknown object detected by the one or more computer vision system. In one embodiment, the labeled image data can be stored in a database as machine learning training data. In one embodiment, this step is a way to crowdsource the UO data to real humans to label and identify what the unknown objects are. In this way, the machine learning module 307 can turn the UO data into a labeled dataset that can be used to train the machine learning object classifiers used in the computer vision systems 101 powering the self-driving vehicles 103.

In step 413, the machine learning module 307 provides an interface to the database for retrieving the machine learning training data to train a machine learning object classifier. For example, this step allows many automotive original equipment manufacturers (OEMs) to fetch the newly labeled data set and update their machine learning algorithms or models for better computer vision and object detection. By way of example, this can be done by the unknown object platform 113 exposing or providing access to the labeled data set in the cloud (e.g., in the training database 125), and the OEMs, vehicles 103, computer vision systems 101, and/or other users can retrieve this newly labeled training dataset. Because new UO events are likely to be constantly reported by computer vision systems 101 in the field, this process can provide a continuous and up-to-date stream of training data to constantly improve the object detection machine learning classifiers of the computer vision systems 101.

In one embodiment, the newly labeled training set are used to re-train object detection machine learning models or classifiers in the cloud by the machine learning module 307. In step 415, the update module 309 transmits the trained machine learning object classifier to the computer vision systems 101 and/or the vehicles 103 or devices equipped with the computer vision systems 101. In one embodiment, the self-driving vehicles 103 can get a batch update of a newly trained vision algorithms, and this update process can also be automated as an over-the-air (OTA) update via the communication network 115.

Returning to FIG. 1, in one embodiment, the vehicles 103 are autonomous vehicles or highly assisted driving vehicles that are capable of sensing their environments and navigating within road network without driver or occupant input. It is noted that autonomous vehicles and highly assisted driving vehicles are part of a spectrum of vehicle classifications that can span from no automation to fully autonomous operation. For example, the U.S. National Highway Traffic Safety Administration ("NHTSA") in its "Preliminary Statement of Policy Concerning Automated Vehicles," published 2013, defines five levels of vehicle automation:

Level 0 (No-Automation)—"The driver is in complete and sole control of the primary vehicle controls—brake, steering, throttle, and motive power—at all times.";

Level 1 (Function-specific Automation)—"Automation at this level involves one or more specific control functions. Examples include electronic stability control or pre-charged brakes, where the vehicle automatically assists with braking to enable the driver to regain control of the vehicle or stop faster than possible by acting alone.";

Level 2 (Combined Function Automation)—"This level involves automation of at least two primary control functions designed to work in unison to relieve the driver of control of those functions. An example of combined functions enabling a Level 2 system is adaptive cruise control in combination with lane centering.";

Level 3 (Limited Self-Driving Automation)—"Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time."; and Level 4 (Full Self-Driving Automation)—"The vehicle is designed to perform all safety-critical driving functions and monitor roadway conditions for an entire trip. Such a design anticipates that the driver will provide destination or navigation input, but is not expected to be available for control at any time during the trip. This includes both occupied and unoccupied vehicles."

In one embodiment, the various embodiments described herein are applicable to vehicles 103 that are classified in any of the levels of automation (levels 0-4) discussed above. For example, in the case of autonomous modes of levels of operation, the vehicles 103 can automatically react to detected unknown objects (e.g., static or dynamic objects). Even in the case of completely manual driving (e.g., level 0), a vehicle 103 can automatically trigger sensors to detect unknown objects and provide greater situational awareness to improve safety for drivers. For example, cameras and/or other sensors (e.g., infrared sensors, LiDAR) can warn drivers of potential nearby humans or animals even when they may be obscured by vegetation or other obstacles (e.g., walls, roadside objects, etc.).

In one embodiment, an object detection classification system (e.g., a machine learning object feature detector) of computer vision system 101 of the vehicle 103 can use imagery data or other sensed data from vehicle sensors 104 (e.g., camera sensor) to automatically detect and/or recognize objects 105 as the vehicle 103 drives. For example, the imagery data is collected in real-time and analyzed by the computer vision system 101. In one embodiment, the software and/or hardware for determining that object 105 is detected as a UO or UMO resides on the vehicle 103 (e.g., in the computer vision system 101 or another module of the vehicle 103). The software and/or hardware system takes the imagery data as input and extracts features from the image for processing by a machine learning classifier. If the classifier is unable to classify or identify the object to a target probability, the object can be referred to as a detected UO resulting in a UO event. If movement of the object is also detected but the object is still not classified, the object can be referred to as a detected UMO resulting in an UMO event.

In one embodiment, vehicles 103 can transmit UO event (e.g., geographic coordinates, temporal parameters, etc.) of any UOs that they detect to the unknown object platform 113 over, e.g., the communication network 115. The vehicles 103 can also transmit any detected characteristics of the detected UO, a time of detection, activation states of the various sensors 104 of the vehicle 103, and/or any other related contextual information (e.g., weather, speed, etc.). The unknown object platform 113 then processes the UO event data received from the computer vision systems 101 of the vehicles 103 and other devices to provide unknown object detection according to the various embodiments described herein.

In one embodiment, when newly arriving vehicles 103 are detected to enter the geographic areas or otherwise meet the pattern of features indicative of high probability UOs, the vehicles 103 can automatically take mitigation action (e.g., reroute, activate other sensors, drive cautiously, reduce speed, etc.) without having to first detect a UO itself. For example, a vehicle 103 may use navigation systems to query the unknown object platform 113 or otherwise received notification from the platform 113 to determine whether the vehicle 103 is entering a scenario associated with an observed UO or a high probability of encountering UOs.

In one embodiment, the unknown object platform 113 has connectivity or access to a training database 125 for storing the labeled training data created from UO event data according to the various embodiments described herein, and as well as a geographic database 123 for retrieving mapping data and/or related attributes for detecting UOs. In one embodiment, the unknown object platform 113, computer vision systems 101, vehicles 103, etc. have connectivity over a communication network 115 to the services platform 117 that provides one or more services 119. By way of example, the services 119 may be third-party services that use detected UO data or rely on machine learning models trained using UO event data. By way of example, the services 119 include, but are not limited to, mapping services, navigation services, travel planning services, notification services, social networking services, content (e.g., audio, video, images, etc.) provisioning services, application services, storage services, contextual information determination services, location based services, information based services (e.g., weather, news, etc.), etc.

In one embodiment, the unknown object platform 113 and/or computer vision systems 101 may be platforms with multiple interconnected components. The unknown object platform 113 and/or computer vision systems 101 may include multiple servers, intelligent networking devices, computing devices, components and corresponding software for providing unknown object detection. In addition, it is noted that the unknown object platform 113 and/or computer vision systems 101 may be separate entities of the system 100, a part of the one or more services 119, a part of the services platform 117, or included within the vehicles 103, fixed installations 107, and user devices 109.

In one embodiment, content providers 121 may provide content or data (e.g., including object detection training data, geographic data, 3D models, parametric representations of mapped features, etc.) to the unknown object platform 113, the computer vision systems 101, the services platform 117, the services 119, the vehicles 103, and/or other components of the system 100. The content provided may be any type of content, such as map content, textual content, audio content, video content, image content, etc. used for providing unknown object detection. In one embodiment, the content providers 121 may also store data used for providing unknown object detection by the unknown object platform 113 according to the various embodiments described herein. In another embodiment, the content providers 121 may manage access to a central repository of data, and offer a consistent, standard interface to data, such as a repository of the training database 125 (e.g., for crowdsourced labeling of UO imagery).

In one embodiment, the computer vision system 101, vehicle 103, fixed installation 107, may execute a software application 111 to capture image data or other observation data for detecting UO events according the embodiments described herein. By way of example, the application 111 may also be any type of application that is executable on the vehicle 103, fixed installation 107, and or UE 109, such as autonomous driving applications, mapping applications, location-based service applications, navigation applications, content provisioning services, camera/imaging application, media player applications, social networking applications, calendar applications, and the like. In one embodiment, the application 111 may act as a client for the unknown object platform 113 and/or computer vision systems 101 and perform one or more functions associated with providing unknown object detection alone or in combination with the unknown object platform 113.

By way of example, the UE 109 is any type of computer system, embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the user device 109 can support any type of interface to the user (such as "wearable" circuitry, etc.). In one embodiment, the user device 109 may be associated with the vehicle 103 or be a component part of the vehicle 103.

In one embodiment, the vehicle 103, fixed installation 107, and/or UE 109 are configured with various sensors for generating or collecting environmental image data (e.g., for processing by the unknown object platform 113 and/or computer vision system 101), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the vehicle 103, fixed installation 107, and/or UE 109 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 103, fixed installation 107, and/or UE 109 may detect the relative distance of the vehicle to unknown objects, the presence of other vehicles, pedestrians, traffic lights, potholes and any other objects, or a combination thereof. In one scenario, the sensors may detect weather data, traffic information, or a combination thereof. In one embodiment, the vehicle 103, fixed installation 107, and/or UE 109 may include GPS or other satellite-based receivers to obtain geographic coordinates or signal for determine the coordinates from satellites 127. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the unknown object platform 113, computer vision system 101, vehicle 103, fixed installation 107, UE 109, services platform 117, services 119, and/or content providers 121 communicate with each other and other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
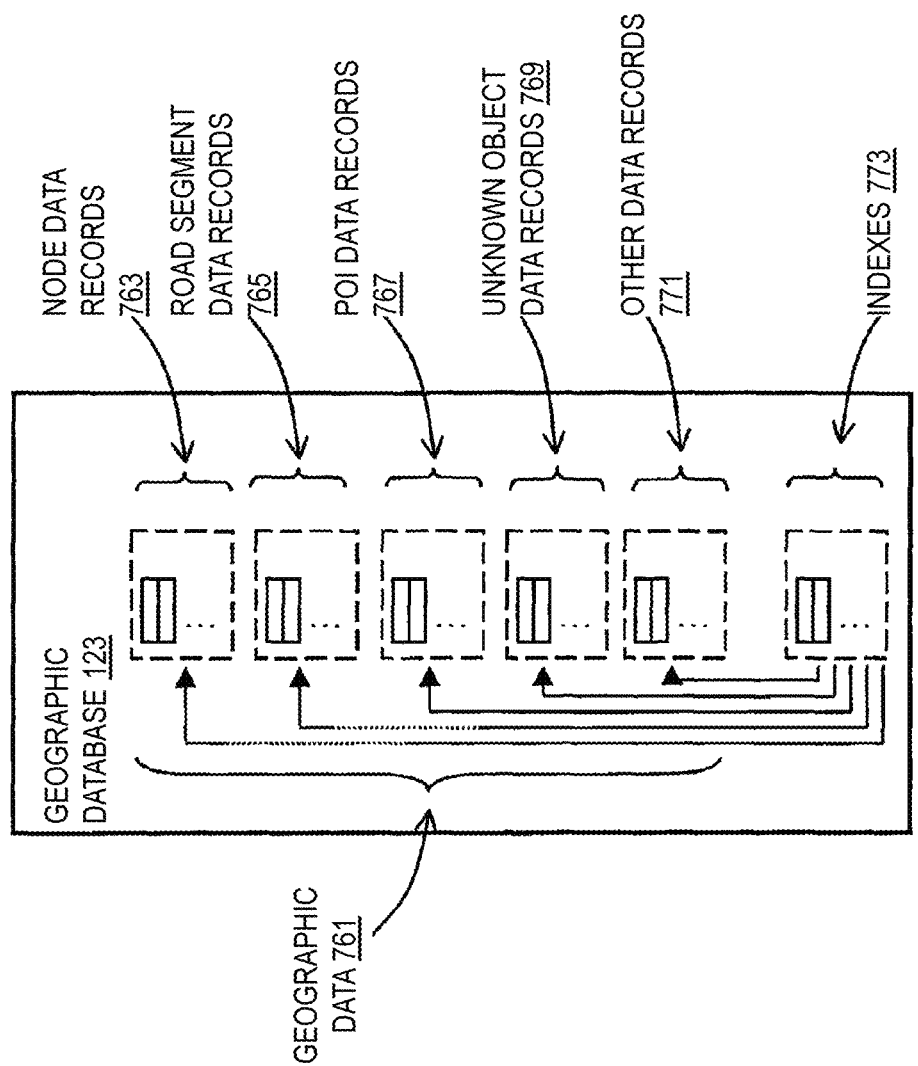
FIG. 7 is a diagram of a geographic database, according to one embodiment.

FIG. 7 is a diagram of a geographic database, according to one embodiment. In one embodiment, the geographic database 123 includes geographic data 701 used for (or configured to be compiled to be used for) mapping and/or navigation-related services, such as for providing unknown object detection. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 703, road segment or link data records 705, POI data records 707, unknown object data records 709, other records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 123. In one embodiment, the indexes 713 may be used to quickly locate data without having to search every row in the geographic database 123 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points corresponding to the respective links or segments of the road segment data records 705. The road link data records 705 and the node data records 703 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 707. The geographic database 123 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 123 can also include unknown object records 709 for storing UO event data, UO clustering data, and/or training data generated from UO event data (e.g., as an alternate or in addition to storage in the training database 125), and/or any related data. The unknown object records 709 can also include alert messages regarding UO events to relay to vehicles 103 detected to travel in the area (e.g., vehicles 103 upstream from the UO event). In one embodiment, the synthetic image data records 709 can be associated with one or more of the node records 703, road segment records 705, and/or POI data records 707 to associate the synthetic image data with specific geographic locations. In this way, the labeled synthetic image data can also be associated with the characteristics or metadata of the corresponding record 703, 705, and/or 707.

In one embodiment, the geographic database 123 can be maintained by the content provider 121 in association with the services platform 117 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicle 103 and/or UE 109) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103 or user device 109, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing unknown object detection may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
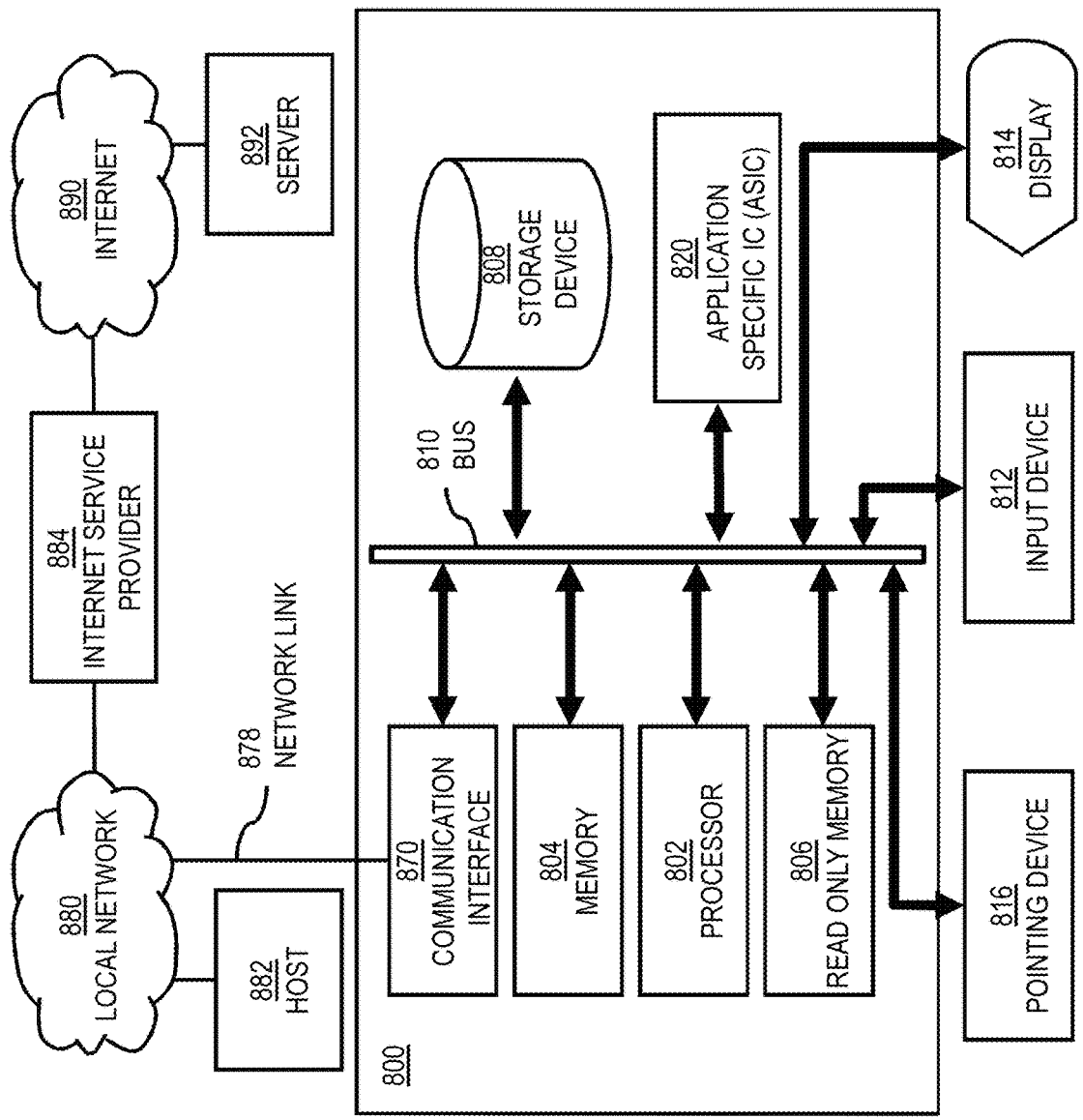
FIG. 8 is a diagram of hardware that can be used to implement an embodiment of the invention.

FIG. 8 illustrates a computer system 800 upon which an embodiment of the invention may be implemented. Computer system 800 is programmed (e.g., via computer program code or instructions) to provide unknown object detection as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to providing unknown object detection. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing unknown object detection. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing unknown object detection, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 115 for providing unknown object detection.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to provide unknown object detection as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide unknown object detection. The memory 905 also stores the data associated with or generated by the execution of the inventive steps.

FIG. 10 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to provide unknown object detection. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing an unknown object detection system comprising:
   capturing a plurality of unknown object events indicating an unknown object detected by one or more computer vision systems mounted on a self-driving car;
   clustering the plurality of unknown object events into a plurality of clusters based on one or more clustering parameters;
   selecting at least one cluster of the plurality of clusters based on a selection criterion;
   determining at least one operating scenario for the one or more computer vision systems based on a combination of the one or more clustering parameters associated with the selected at least one cluster, wherein the selected at least one cluster corresponds to a geographic area; and
   generating a message to route another self-driving car within the geographic area based on the determined operating scenario,
   wherein the message is generated before the another self-driving car detects the unknown object, and wherein the selection criterion includes a highest number of the plurality of unknown object events, a probability of having the highest number of the plurality of unknown object events, or a combination thereof.

2. The method of claim 1, wherein the one or more computer vision systems include another computer vision system mounted on a structure that is on or proximate to the road network.

3. The method of claim 1, wherein the one or more clustering parameters include one or more spatial-temporal parameters, a detected shape of an unknown object, a speed of the unknown object, a direction of the unknown object, a road segment or a location at which the unknown object was detected, a time of day at which the unknown object was detected, a weather condition occurring when the unknown object was detected, a car type associated with the one or more computer vision systems, a speed of the one or more computer vision systems, a heading of the one or more computer vision systems, or a combination thereof.

4. The method of claim 1, further comprising:
   determining that the one or more computer vision systems is subsequently operating under the at least one operating scenario, wherein the at least one operating scenario involves weather condition, lighting condition, or a combination thereof; and
   initiating an action to mitigate an object detection uncertainty of the one or more computer vision systems.

5. The method of claim 1, wherein the at least one operating scenario, the combination of the one or more clustering parameters associated with the selected at least one cluster, or a combination thereof is stored in a database for access by one or more cars equipped with the one or more computer vision systems.

6. The method of claim 1, further comprising:
   aggregating image data associated with the plurality of unknown object events; and
   transmitting the image data for labeling to identify the unknown object detected by the one or more computer vision systems,
   wherein the labeled image data is stored in a database as machine learning training data.

7. The method of claim 6, further comprising:
   providing an interface to the database for retrieving the machine learning training data to train a machine learning object classifier.

8. The method of claim 7, further comprising:
   transmitting the trained machine learning object classifier to the one or more computer vision systems, one or more other computer vision systems, or a combination thereof.

9. The method of claim 8, wherein the one or more computer vision systems, the one or more other computer vision systems, or a combination thereof is a component of the self-driving car configured to operate autonomously or semi-autonomously.

10. An apparatus for providing an unknown object detection system comprising:
  at least one processor; and
  at least one memory including computer program code for one or more programs,
  the at least one memory and the computer program code configured to, with the at least one processor, cause the apparatus to perform at least the following,
    capture a plurality of unknown object events indicating an unknown object detected by one or more computer vision systems mounted on a self-driving car;
    cluster the plurality of unknown object events into a plurality of clusters based on one or more clustering parameters;
    select at least one cluster of the plurality of clusters based on a selection criterion;
    determine at least one operating scenario for the one or more computer vision systems based on a combination of the one or more clustering parameters associated with the selected at least one cluster, wherein the selected at least one cluster corresponds to a geographic area; and
    generate a message to route another self-driving car within the geographic area based on the determined operating scenario,
    wherein the message is generated before the another self-driving car detects the unknown object, and wherein the selection criterion includes a highest number of the plurality of unknown object events, a probability of having the highest number of the plurality of unknown object events, or a combination thereof.

11. The apparatus of claim 10, wherein the apparatus is further caused to:
  determine that the one or more computer vision systems is subsequently operating under the at least one operating scenario, wherein the at least one operating scenario involves weather condition, lighting condition, or a combination thereof; and
  initiate an action to mitigate an object detection uncertainty of the one or more computer vision systems.

12. The apparatus of claim 10, wherein the apparatus is further caused to:
  aggregate image data associated with the plurality of unknown object events; and
  transmit the image data for labeling to identify the unknown object detected by the one or more computer vision systems,
  wherein the labeled image data is stored in a database as machine learning training data.

13. The apparatus of claim 12, wherein the apparatus is further caused to:
  provide an interface to the database for retrieving the machine learning training data to train a machine learning object classifier.

14. The apparatus of claim 13, wherein the apparatus is further caused to:
  transmit the trained machine learning object classifier to the one or more computer vision systems, one or more other computer vision systems, or a combination thereof.

15. A non-transitory computer-readable storage medium carries one or more sequences of one or more instructions which, when executed by one or more processors, cause, at least in part, an apparatus to perform:
  capturing a plurality of unknown object events indicating an unknown object detected by one or more computer vision systems mounted on a self-driving car;
  clustering the plurality of unknown object events into a plurality of clusters based on one or more clustering parameters;
  selecting at least one cluster of the plurality of clusters based on a selection criterion;
  determining at least one operating scenario for the one or more computer vision systems based on a combination of the one or more clustering parameters associated with the selected at least one cluster, wherein the selected at least one cluster corresponds to a geographic area; and
  generating a message to route another self-driving car within the geographic area based on the determined operating scenario,
  wherein the message is generated before the another self-driving car detects the unknown object, and wherein the selection criterion includes a highest number of the plurality of unknown object events, a probability of having the highest number of the plurality of unknown object events, or a combination thereof.

16. The non-transitory computer-readable storage medium of claim 15, wherein the apparatus is further caused to perform:
  determining that the one or more computer vision systems is subsequently operating under the at least one operating scenario, wherein the at least one operating scenario involves weather condition, lighting condition, or a combination thereof; and
  initiating an action to mitigate an object detection uncertainty of the one or more computer vision systems.

17. The non-transitory computer-readable storage medium of claim 15, wherein the apparatus is further caused to perform:
  aggregating image data associated with the plurality of unknown object events; and
  transmitting the image data for labeling to identify the unknown object detected by the one or more computer vision systems,
  wherein the labeled image data is stored in a database as machine learning training data.

18. The non-transitory computer-readable storage medium of claim 17, wherein the apparatus is further caused to perform:
  providing an interface to the database for retrieving the machine learning training data to train a machine learning object classifier.

19. The non-transitory computer-readable storage medium of claim 18, wherein the apparatus is further caused to perform:
  transmitting the trained machine learning object classifier to the one or more computer vision systems, one or more other computer vision systems, or a combination thereof.

* * * * *